United States Patent
Kaplinsky

(10) Patent No.: US 7,492,390 B2
(45) Date of Patent: Feb. 17, 2009

(54) DUAL SPECTRAL BAND NETWORK CAMERA

(75) Inventor: Michael Kaplinsky, Sierra Madre, CA (US)

(73) Assignee: Arecont Vision, LLC., Glendale, CA (US)

( * ) Notice: Subject to any disclaimer, the term of this patent is extended or adjusted under 35 U.S.C. 154(b) by 735 days.

(21) Appl. No.: 10/890,911

(22) Filed: Jul. 14, 2004

(65) Prior Publication Data

US 2005/0140786 A1    Jun. 30, 2005

Related U.S. Application Data

(60) Provisional application No. 60/486,927, filed on Jul. 14, 2003.

(51) Int. Cl.
*H04N 5/232* (2006.01)
(52) U.S. Cl. .................. 348/217.1; 348/211.3
(58) Field of Classification Search .............. 348/143, 348/151–153, 159, 211.99, 211.1–211.5, 348/211.11, 211.14, 216.1, 217.1
See application file for complete search history.

(56) References Cited

U.S. PATENT DOCUMENTS

| | | | | |
|---|---|---|---|---|
| 5,130,814 | A * | 7/1992 | Spencer | 386/109 |
| 5,379,069 | A * | 1/1995 | Tani | 348/333.11 |
| 5,436,660 | A * | 7/1995 | Sakamoto | 348/229.1 |
| 6,288,742 | B1 * | 9/2001 | Ansari et al. | 348/211.14 |
| 6,323,858 | B1 * | 11/2001 | Gilbert et al. | 345/419 |
| 6,816,676 | B2 * | 11/2004 | Bianchi et al. | 396/282 |
| 7,057,647 | B1 * | 6/2006 | Monroe | 348/217.1 |
| 7,106,374 | B1 * | 9/2006 | Bandera et al. | 348/308 |
| 2002/0048080 | A1 * | 4/2002 | Nagatoshi et al. | 359/399 |
| 2002/0135677 | A1 * | 9/2002 | Noro et al. | 348/143 |
| 2002/0176010 | A1 * | 11/2002 | Wallach et al. | 348/229.1 |
| 2002/0191082 | A1 * | 12/2002 | Fujino et al. | 348/211.14 |
| 2003/0048493 | A1 * | 3/2003 | Pontifex et al. | 358/514 |
| 2003/0093805 | A1 * | 5/2003 | Gin | 725/105 |
| 2004/0070682 | A1 * | 4/2004 | Voss et al. | 348/362 |

* cited by examiner

*Primary Examiner*—Timothy J Henn
(74) *Attorney, Agent, or Firm*—Christie, Parker & Hale, LLP.

(57) ABSTRACT

The subject of this invention is the network camera sensitive to both visual and near-infrared or infrared spectral bands and comprising two or more image sensors with different spectral responses, one or more image processors, and network interfaces. In the preferred embodiment the network camera disclosed in this invention comprises two image sensors with individual optics, where both sensors have similar fields of view. In the preferred embodiment of the present invention one of the sensors is color image sensor with infrared-cut filter positioned in front of pixel array, while the other sensor is monochrome image sensor with optics characterized by lower f-number than that used for color sensor and without infrared-cut filter in its field of view. In one of the embodiments of this invention, monochrome sensor has larger pixel sizes than color sensor to provide for higher low-light sensitivity.

11 Claims, 4 Drawing Sheets

Block diagram of Dual Spectral Band Network Camera

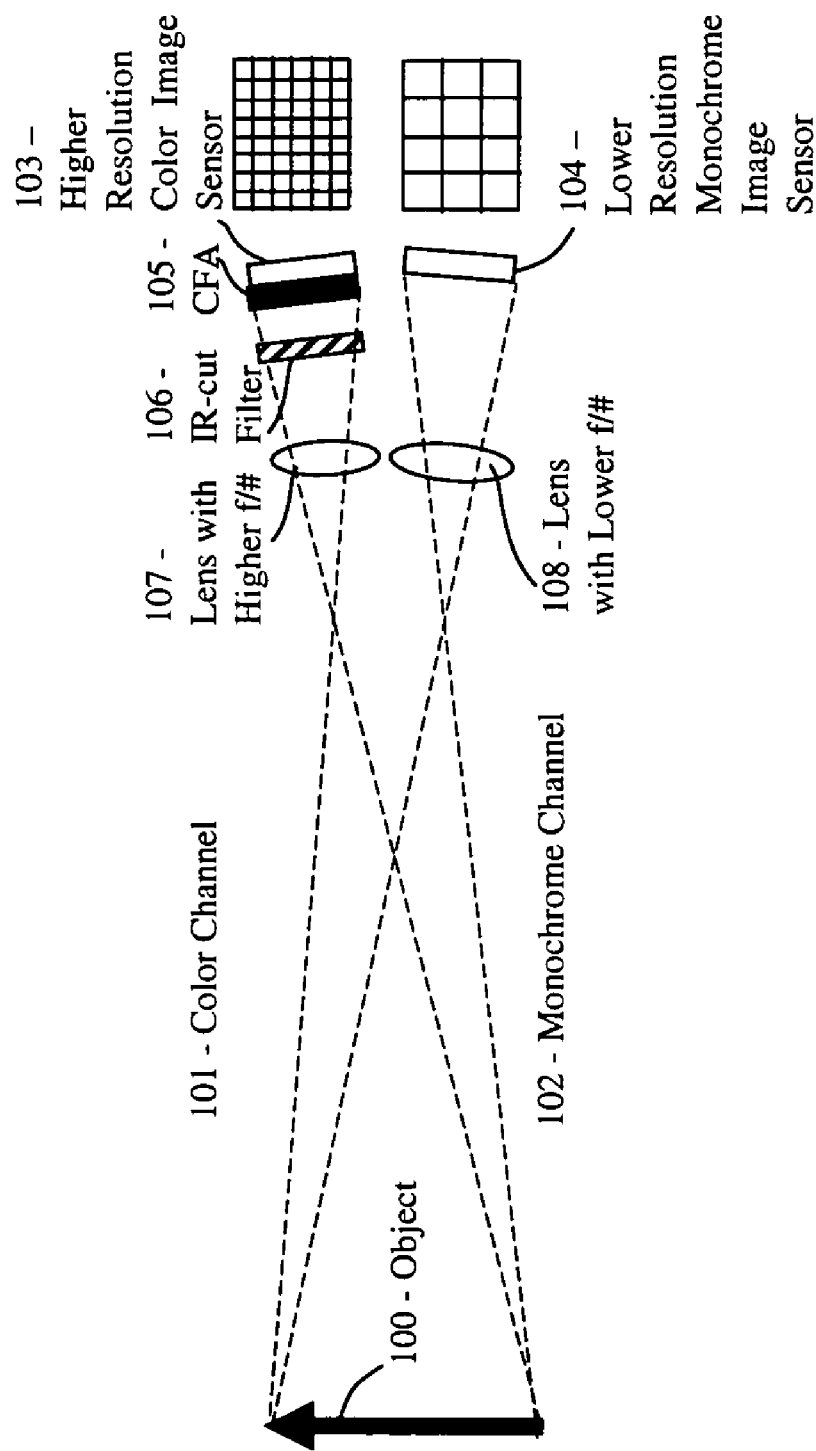
Figure 1. Dual spectral band network camera head

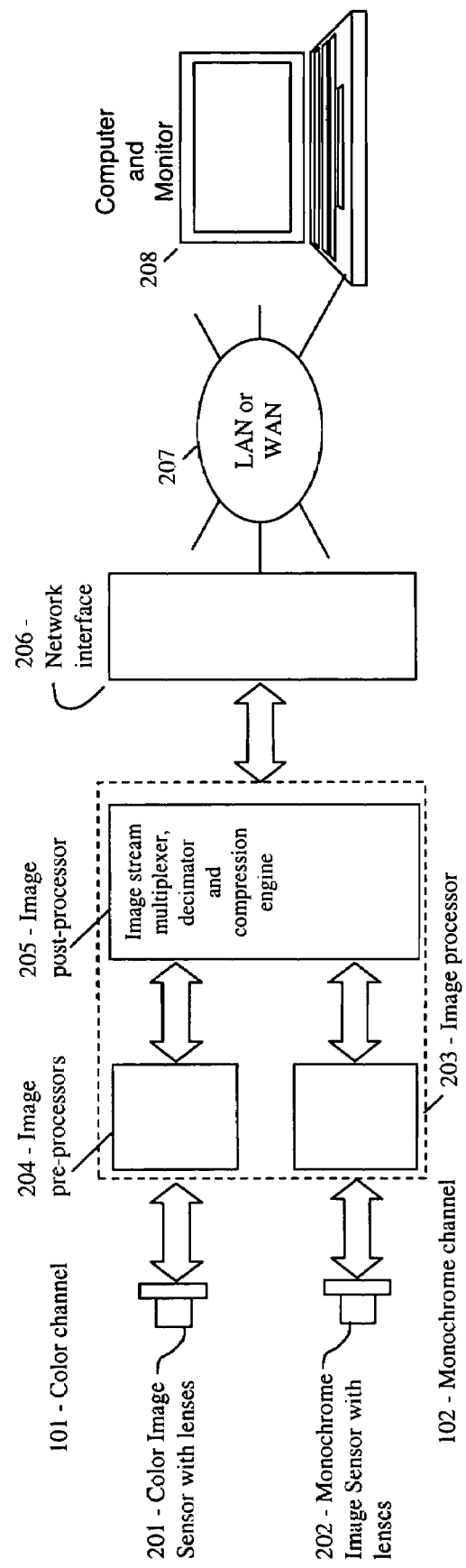
Figure 2. Block diagram of Dual Spectral Band Network Camera

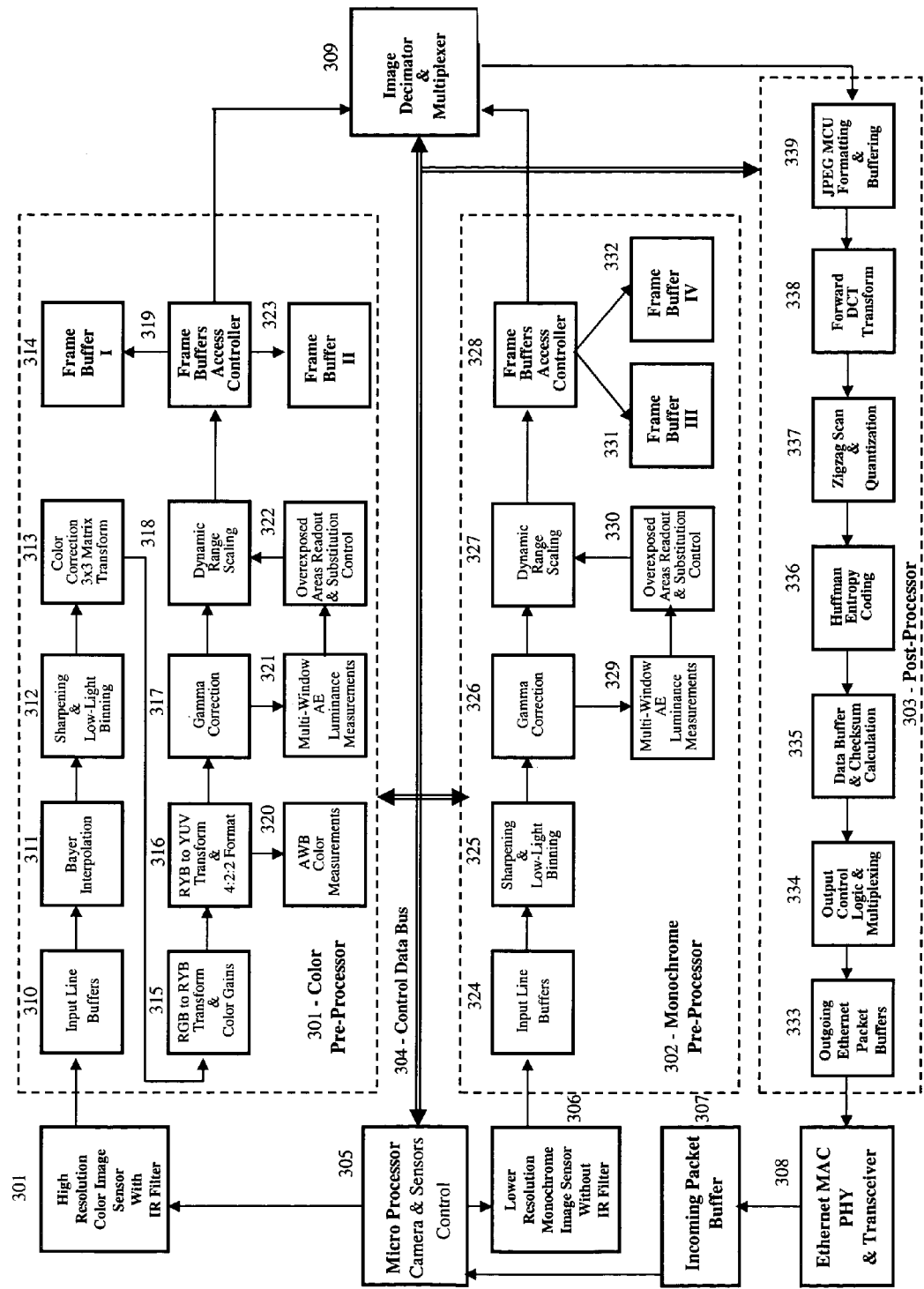
Figure 3. Preferred Embodiment of Dual-Band Network Camera

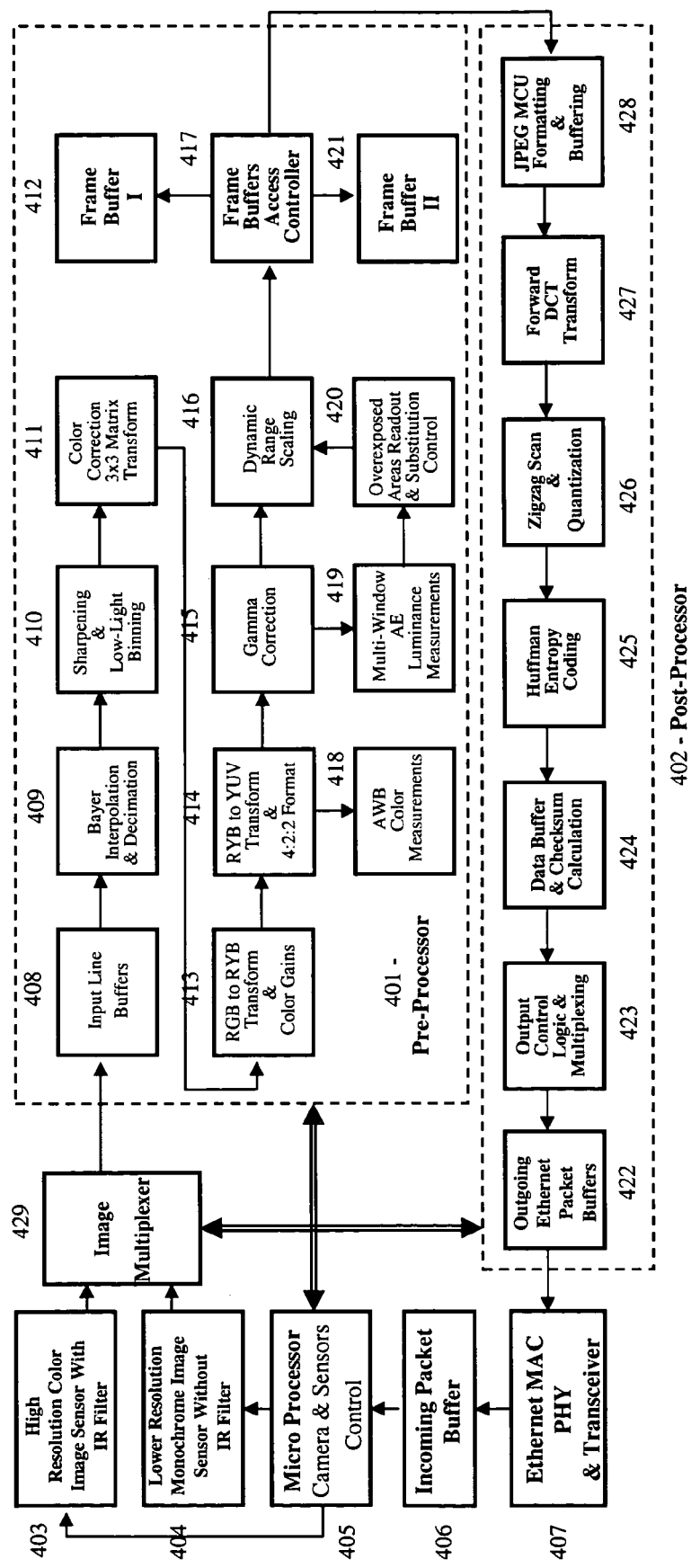
Figure 4 Another Embodiment of Dual-Band Network Camera

DUAL SPECTRAL BAND NETWORK CAMERA

CROSS REFERENCE TO RELATED APPLICATIONS

This application claims the benefit of U.S. Provisional Application No. 60/486,927, filed Jul. 14, 2003, the contents of which are incorporated by reference herein. This application is also related to U.S. application Ser. No. 10/890,912, filed on Jul. 14, 2004.

Also incorporated by reference herein are the following applications filed on even date herewith:

| Title | Priority Application |
| --- | --- |
| WIDE DYNAMIC RANGE NETWORK CAMERA | 60/486,929 |
| MULTI-SENSOR PANORAMIC NETWORK CAMERA | 60/486,928 |
| DISTRIBUTED VIDEO SURVEILLANCE SYSTEM WITH SECURE REMOTE STORAGE OF ALARMED IMAGES AND REMOTELY ACCESSIBLE IMAGE ARCHIVES | 60/486,926 |
| HIGH-RESOLUTION NETWORK CAMERA WITH AUTOMATIC BANDWIDTH CONTROL | 60/486,930 |
| VIDEO SURVEILLANCE SYSTEM WITH TARGET PATH RECONSTRUCTION | 60/486,931 |

SUMMARY

The subject of this invention is the network camera sensitive to both visual and near-infrared or infrared spectral bands and comprising two or more image sensors with different spectral responses, one or more image processors, and network interfaces. In the preferred embodiment the network camera disclosed in this invention comprises two image sensors with individual optics, where both sensors have similar fields of view. In the preferred embodiment of the present invention one of the sensors is color image sensor with infrared-cut filter positioned in front of pixel array, while the other sensor is monochrome image sensor with optics characterized by lower f-number than that used for color sensor and without infrared-cut filter in its field of view. In one of the embodiments of this invention, monochrome sensor has larger pixel sizes than color sensor to provide for higher low-light sensitivity.

In the preferred embodiment of this invention image processor continuously monitors exposure settings of the image sensors as well as brightness of both color and monochrome images and selects the image to be transmitted off camera based on the illumination conditions, where low illumination will cause the image from the monochrome sensor to be transmitted. In another embodiment, images from both sensors are simultaneously transmitted off-camera. In the latter embodiment, the monochrome image will, in general, have shorter optical integration time and may have faster frame-rate due to higher sensitivity in the absence of color and infrared filters. The monochrome image will also, in general, have higher modulation transfer function due to absence of color processing, thus providing sharper images of moving objects and facilitating their feature recognition and tracking.

BRIEF DESCRIPTION OF FIGURES

FIG. 1 depicts dual spectral band network camera head;

FIG. 2 depicts block diagram of dual spectral band network camera;

FIG. 3 depicts preferred embodiment of dual band network camera; and

FIG. 4 depicts another embodiment of dual band network camera.

DETAILED DESCRIPTION

The main components comprising dual-band network camera system are shown in FIG. 2. Referring to FIG. 2, the subject of the present invention is the dual-sensor dual-band network camera apparatus comprising two or more image sensors with different spectral responses and individual optics (201 and 202), one or more image processors (203), where at least one image processor is common to two or more sensors (205), one or more image buffer memories (not shown) and one or more network interfaces (206), where said components are mounted within single enclosure. In its preferred embodiment the present invention also includes a computer system with monitor connected to the camera via computer network (207) and used for acquisition and display of the camera images (208).

FIG. 1 depicts the camera head of the preferred embodiment of the present invention. In the preferred embodiment of the present invention one of the image sensors is high-resolution color image sensor (103) with IR cut filter (106) positioned in front of its focal plane array, while the second image sensor is lower resolution monochrome image sensor (104) without an IR filter positioned in front of its focal plane array. In one of the embodiments of the present invention optics used with monochrome image sensor (108) has lower f-number than the optics (107) used for color sensor. In another embodiment of this invention optics used with monochrome sensor does not have built-in infrared-cutoff sensor and transmits light in infrared and near-infrared spectral bands. In yet another embodiment of the present invention monochrome sensor has pixels with larger light-sensitive area than that of the color sensor.

In the preferred embodiment of this invention network camera comprises one color and one monochrome image sensors, image buffer memories, image processing module and network interface, where said image processing module is equipped to act as an image sensor controller for both sensors and is equipped to process images from both sensors either in parallel or by switching between the two video streams on a frame-by-frame basis, where said processing includes all the processing necessary to convert output of the sensors into compressed video stream and may comprise color correction, color space transformation, white balance, auto exposure, and sensor control, dynamic range enhancement processing as well as image compression into JPEG, MPEG or other format and where said network interface comprises network protocol processor and physical interface to computer or proprietary network.

In the preferred embodiment of this invention both color and monochrome images are transmitted off-camera via network on a time-interleaved basis, where interleaving may be performed on 8 by 8 lines basis, frame by frame basis or multiple frames from one sensor followed by one or more frames from another sensor basis. In another embodiment of the present invention the image-processing unit selects the sensor whose images are transferred off camera via network based on the image brightness and optical integration times and/or current frame-rates of the imagers. In the later embodiment the monochrome image is selected where illumination of the scene is low and signal-to-noise ratio of the color image is poor or when the camera is used for feature recognition of the moving object and the optical integration time of the monochrome imager is shorter than that of color imager providing less distortion in the images of moving objects.

In yet another embodiment of the present system the software located on the receiving end of the network connection performs the selection of the image for transmission off camera via the network interface. In still another embodiment of the present invention software located on the receiving end of the network connection may also perform auto-exposure, white balance, image windowing and other computations that produce camera/imager control stimuli that are subsequently transmitted back to the camera via network interface, simplifying the functionality of camera on-board image processing hardware.

In the preferred embodiment of the present invention the images from color and monochrome image sensors are pre-processed concurrently, wherein color images are first processed by color image pre-processor while monochrome images are first processed by monochrome image pre-processor, with both image streams connected to a common image post-processor through a multiplexer. In another embodiment of the present invention color and monochrome images are multiplexed into single color pre-processor, where color-related processing steps are bypassed during monochrome image processing.

In the preferred embodiment of the present invention, the dual band network camera comprises two image sensors that are monochrome (306) and color (301) CMOS image sensors capable of optical integration and readout of the selected sub-frames, image buffer memory (314, 323, 331 and 332), network interface (333 and 308) and ASIC or Field Programmable Gate Arrays (FPGAs) operating under control of low cost microprocessor (305), where said ASIC or FPGAs implement color image pre-processor (301), monochrome image pre-processor (302) and image post processor (303) in the form of massively parallel image processing pipelines executing time-critical operations on image pixels, where the flow of image pixels is operated on by the sequential stages of the pipelines with each pipeline stage operating in parallel with all or most of the other pipeline stages, while said microprocessor controls the operation of the image processing pipelines, performs initialization operations, controls monochrome vs color image multiplexing, relatively slow operations (performed on a once-per-frame basis) associated with auto exposure, white balance, wide dynamic range processing and protocol-level network interface computations as well as maintains the register space constituting the user interface to the camera. The block diagram of the image processor module of the preferred embodiment of the present invention is shown in FIG. 3.

In the preferred embodiment of the present invention, color image pre-processor is implemented as image processing pipeline that comprises multiple line memory buffers for 2-dimensional processing (310), block for image interpolation of one-color-per-pixel Bayer pixel array into 3 color-per-pixel stream (311), block implementing image sharpening and low-light signal-to-noise improvement by applying high-pass and low-pass filters to the image (312), color correction block implementing the multiplication of the RGB pixel components by 3×3 color correction matrix (313), RGB to YUV transformation blocks (315 and 316), gamma correction block (317), dynamic range scaling block, implemented with programmable multipliers (318), block responsible for generation of overexposed sub-frames map and substitution of pixels in the composite frame (322), as well as multi-window Auto Exposure (AE) (321) and Auto White Balance (AWB) (320) measurement engines that collect image brightness and color statistics required for the wide dynamic range processing separately disclosed by the author of the present invention and for AE and AWB algorithms, two frame buffers (314 and 323) and associated memory access controller (319) for assembly of the composite wide dynamic range image and ping-pong buffering of processed frames.

In the preferred embodiment of the present invention, monochrome image pre-processor is implemented as image processing pipeline that comprises multiple line memory buffers for 2-dimensional processing (324), block implementing image sharpening and low-light signal-to-noise improvement by applying high-pass and low-pass filters to the image (325), gamma correction block (326), dynamic range scaling block, implemented with programmable multipliers (327), block responsible for generation of overexposed sub-frames map and substitution of pixels in the composite frame (330), as well as multi-window Auto Exposure (AE) (329) measurement engine that collect image brightness statistics required for the wide dynamic range processing separately disclosed by the author of the present invention and for AE algorithm, two frame buffers (331 and 332) and associated memory access controller (328) for assembly of the composite wide dynamic range image and ping-pong buffering of processed frames.

FIG. 4 depicts another embodiment of the present invention wherein outputs of color and monochrome image sensors are multiplexed into single color pre-processor, where color-related processing steps are bypassed during monochrome image processing. This embodiment may allow for lower cost implementation of the present invention while reducing the overall image processing bandwidth of the camera.

In the preferred embodiment of the present invention image post-processor (303) comprises pipelined JPEG image compression and network packet generation modules.

In the preferred embodiment of the invention, pipelined implementation of JPEG compression includes blocks that perform MCU formation and buffering (339), Forward Discrete Cosine Transform (FDCT) (338), zigzag scan, quantization (337) and entropy coding (336). In the preferred embodiment of the present invention 2-dimensional FDCT is implemented as two passes through 1-Dimensional FDCT transform, utilizing the fact that FDCT is a separable transformation.

In yet another embodiment of the present invention, more efficient image compression, such as JPEG2000 or MPEG is substituted for baseline JPEG implementation.

In the preferred embodiment of the present invention a modified version of Trivial File Transfer Protocol (TFTP—as described in RFC783) is implemented as the primary mode of image transmission, where TFTP protocol headers are formed and recorded in the transmit packet buffers (333) by the microprocessor (305), data fields of the TFTP packets, i.e. image data, along with the corresponding checksums are formed by the output stages of the image processing pipeline (334).

In the preferred embodiment of the present invention, following the image compression, the image stream is stored in one of the three network packet buffers, where these buffers are arranged in such a way, that one buffer contains the packet currently being transmitted to the Media Access Control (MAC) Ethernet interface (308), one buffer contains a packet to be transmitted next and one buffer is available for storage of the compressed data coming out of the image compression module. This triple buffered arrangement guarantees that there is always a packet available for transmission, thus maximizing utilization of available network bandwidth and also facilitates re-transmission in the event of network errors.

In the preferred embodiment of the present invention, microprocessor interfaced with image processing pipeline and Ethernet MAC and PHY hardware is also used to support a number of network protocols. In the preferred embodiment, to reduce overall complexity of implementation, a minimal set of protocols consisting of UDP, TFTP, ARP, IP, and ICMP protocols are supported.

In another embodiment of the present invention TCP/IP and DHCP protocols are also supported.

What is claimed as new and desired to be protected by Letters of Patent of the United States is:

1. Dual spectral band network video camera comprising:
   two or more image sensors characterized by distinctly different sensitivities to the intensity of illumination incident on said image sensors;
   a network interface for transmitting image data streams originated by said image sensors to a communication network; and an image processor configured to monitor exposure settings of the image sensors and brightness of respective images from each image sensor, and select an image to be transmitted to the communication network based on the exposure settings and the brightness.

2. Dual spectral band network camera of claim 1, wherein at least one of said image sensors is a color image sensor and wherein at least one of said image sensors is a monochrome image sensor.

3. Dual spectral band network camera of claim 1, wherein all of said image sensors have substantially similar fields of view.

4. Dual spectral band network camera of claim 2, wherein an infra-red cut filter is positioned in front of focal plane array of said color image sensor and wherein there is no infra-red cut filter positioned in front of focal plane array of said monochrome image sensor.

5. Dual spectral band network camera of claim 2, wherein said monochrome image sensor comprises pixels with larger light sensitive area than light sensitive area of the pixels of said color image sensor.

6. Dual spectral band network camera of claim 2, wherein said color image sensor is a high-resolution image sensor comprising more than 1 million pixels.

7. Dual spectral band network camera of claim 1, wherein individual optics or lens is positioned in front of the focal plane arrays of each of said image sensors and wherein said optics or lens positioned in front of more light sensitive image sensor has lower f-number than said optics positioned in front of less light sensitive image sensor.

8. Dual spectral band network camera of claim 1, wherein said network interface is Ethernet network interface.

9. Dual spectral band network camera of claim 1, wherein said network interface supports one or more of the group including TCP, UDP, TFTP, and IP protocols.

10. Dual spectral band network camera of claim 1, wherein said multiplexing of said image data streams is performed on a time-interleaved basis, where transmission of some portion of data stream from one of said image sensors is followed by the transmission of some portion of data stream from another of said image sensors.

11. Dual spectral band network camera of claim 1, wherein said means of multiplexing of image data streams are configured to allow for selection of the image data streams to be transmitted off camera to be controlled from an external input.

* * * * *